(Model.)

A. D. COOK.
Well Point.

No. 240,969. Patented May 3, 1881.

Witnesses.
Franck L. Durand
J. J. McCarthy

Inventor
August D. Cook
By Alexander Mason
atty

UNITED STATES PATENT OFFICE.

AUGUST D. COOK, OF LAWRENCEBURG, INDIANA.

WELL-POINT.

SPECIFICATION forming part of Letters Patent No. 240,969, dated May 3, 1881.

Application filed March 5, 1881. (Model.)

*To all whom it may concern:*

Be it known that I, AUGUST D. COOK, of Lawrenceburg, in the county of Dearborn, and in the State of Indiana, have invented certain new and useful Improvements in Well-Points or Well-Strainers; and I do hereby declare that the following is a full, clear, and exact description thereof, reference being had to the accompanying drawings, and to the letters of reference marked thereon, making a part of this specification.

This invention relates to certain improvements in driven wells; and it has for its objects to provide a strainer so constructed that while it readily permits of the entrance of water it will be impossible for the apertures to become clogged, as more fully hereinafter explained. These objects I attain by the device illustrated in the accompanying drawings, in which—

Figure 1:
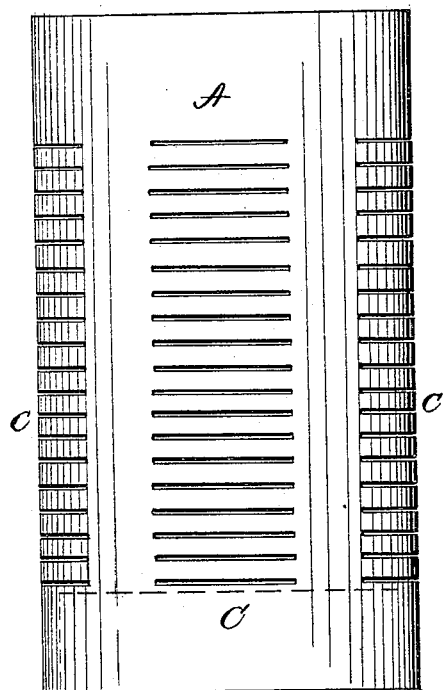
Figure 2:
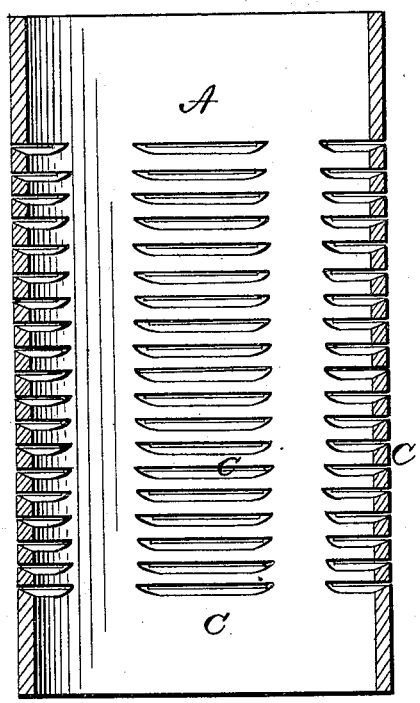

Figure 1 represents a side elevation of my improved strainer with the driving-point attached; Fig. 2, a sectional view of the strainer, and Fig. 3 a section showing the perforations.

Figure 3:
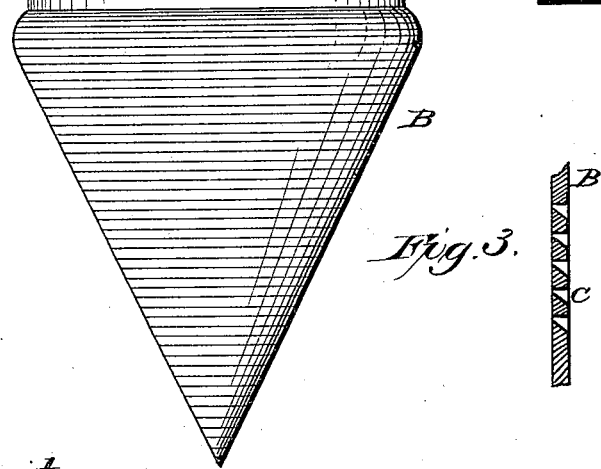

The letter A indicates the strainer, which consists of a cylindrical shell of metal with a driving-point, B, at its lower end. The said shell is provided with a series of parallel slots, C, through its walls for the passage of the water. These slots are cut from the inside with a suitable cutter, and are beveled, as indicated in Fig. 3, so that their lower edges will incline inwardly and downwardly, the slots being thus enlarged inwardly, so that any sand or dirt that may possibly pass through them will find no lodgment, but will escape on the inside, thus leaving the slots at all times free. The slots are so cut as to form no projections or burrs on the outside of the shell, leaving the same perfectly smooth and plain, in order that it may be driven without difficulty, and so that it will not collect dirt or sand in the slots while being driven.

The shell may be attached to the well-tube in the usual or any approved manner, and is driven by the methods and means in ordinary use.

Having thus described my invention, what I claim, and desire to secure by Letters Patent, is—

A strainer for driven wells, constructed of a cylindrical metallic shell having a series of parallel slots through its walls, the lower edges being beveled on the inside to permit dirt or other solid matter to drop out and prevent clogging, substantially as specified.

In testimony that I claim the foregoing I have hereunto set my hand and seal this 26th day of February, 1881.

AUGUST D. COOK. [L. S.]

Witnesses:
J. JOE MCCARTHY,
JOSEPH RUSSELL.